April 29, 1969 G. N. DE MURA 3,440,945

WATERPROOF VENTILATOR FOR BOAT WINDSHIELDS

Filed Oct. 25, 1967

INVENTOR.
GEORGE N. DE MURA
BY
W. J. Gribble
ATTORNEY

United States Patent Office 3,440,945
Patented Apr. 29, 1969

3,440,945
WATERPROOF VENTILATOR FOR BOAT WINDSHIELDS
George N. de Mura, Rte. 1, Box 666, Space 85, Alta Sierra Drive, Grass Valley, Calif. 95945
Filed Oct. 25, 1967, Ser. No. 677,989
Int. Cl. F24f 7/00; B60l 1/00
U.S. Cl. 98—37                    7 Claims

ABSTRACT OF THE DISCLOSURE

A transparent ventilator box with an air intake at the bottom projects from the normal plane of the windshield. A transparent baffle is hinged near the bottom intake. The top of the baffle curves forwardly to terminate in a sealing edge movable away from and against the inner face of the ventilator box. Parallel side flanges of the ventilator baffle movably seal against parallel sides of the ventilator box. The hinge line of the ventilator baffle is aft or back of the ventilator box opening. The baffle terminates below the upper wall of the ventilator box, and, when the baffle is pivoted away from the face of the ventilator box, air flow occurs between the curved baffle top and the ventilator box.

Background of the invention

Ventilation of small craft, such as motorboats, tugs and other waterborne craft, is made difficult by the presence of moisture spray in the air close to the water, particularly when there is water turbulence when the craft is under way. The most efficient method of ventilating a craft is to open the front of the windshield while the craft is under way. However, the windshield is that portion of the upper boat structure which receives the bulk of the water spray. Heretofore complicated baffle arrangements have been used to eliminate the spray entering the cockpit. These have not proved satisfactory, either in eliminating moisture or maintaining good visibility.

Summary of the invention

The invention contemplates a transparent waterproof ventilator for use with a boat windshield that comprises a transparent ventilator box projecting forwardly of the normal plane of the windshield. Preferably the ventilator box is fitted into an opening in the central portion of the windshield. However, two such ventilators may be used on either side of the center line of the shield. A forwardly projecting top and parallel side panels are sealed together and sealed to the windshield (or to a frame attached to the windshield) to define the ventilator box. A transparent front panel extends from the top of the box to a ventilation opening in the bottom of the box. Preferably the front panel curves inwardly at its bottom and its terminating edge defines the front line of the opening. A transparent baffle with parallel side flanges resides within the box. Hinge means secure the baffle to the box adjacent the bottom thereof. A bottom portion of the baffle projects forwardly beyond the normal plane of the windshield. A baffle hood extends across the top of the baffle. The forward portion of the hood matches the configuration of the front panel of the ventilator box such that the hood seals against the inside of the front panel when the baffle is closed. The hood terminates below the inner top of the ventilator box. The baffle may have an interior handle for opening and closing the baffle.

When the baffle is closed air and airborne spray enter through the ventilator opening and generally impinge upon the forward face of the baffle. That portion of spray and wind which reaches the baffle hood is diverted downwardly against the inner face of the ventilator box. The moisture gathers on the faces of the baffle and the ventilator box and exists in rivulets through the ventilator opening.

When the baffle is pulled inwardly so that a gap exists between the baffle hood and the inner face of the ventilator box, air flow enters through the ventilator port, extends along the forward face of the baffle and flows upwardly along the curve of the hood and then through the opening between the baffle and the ventilator box and into the cockpit above the baffle hood. The baffle flanges are in contact with the side panels of the ventilator box. No air or moisture can enter the cockpit because of their friction seal. All flow must be around and over the baffle hood. The airborne spray again impinges upon the face of the baffle and trickles downwardly and out in front of the plane of the windshield over the bottom edge of the baffle. The hood precludes upward flow of the spray because of the heavier quality of the spray droplets. The course along the face of the baffle reduces the velocity of the droplets such that they do not make the direction reversal that the air does in order to accomplish flow over the top of the baffle hood.

The ventilator box may be a separable transparent box open on one side which is fixed within an operture of the windshield. Alternatively, the box may be formed as a protrusion in the windshield itself at the time the windshield is formed. The baffle, which is preferably entirely of transparent material, may be hinged near its bottom edge or pivot points may be fixed at the bottom portion of the side panels. The bottoms of the flanges of the baffle are curved to reside within the curving portion of the front panel of the ventilator box.

The ventilator of the invention is extremely simple in operation and can be formed from existing commercial materials. There is little limitation on the size of the ventilator box and it can be positioned conveniently either centrally or asymmetrically of the windshield or other forward glass of the craft.

These and other advantages of the invention are apparent from the following detailed description and drawing.

Brief description of the drawing

In the figures like parts have been given like reference characters.

FIG. 1 illustrates schematically a waterborne craft 11. The craft has a windshield 12 with vertical frame members 14, 15 and an overhead frame member 16. The windshield terminates against the hull 18 of the craft.

Figure 1:
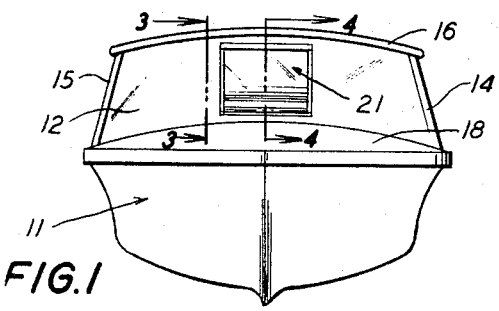
FIG. 1 is a front view of a waterborne craft with the ventilator of the invention centrally disposed in the windshield.
Figure 2:
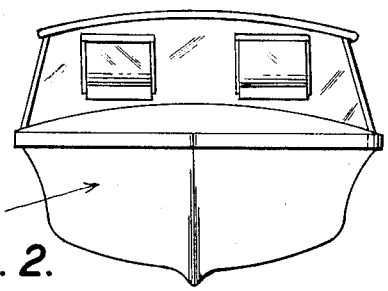
FIG. 2 is a front view of a craft having two ventilators in accordance with the invention mounted on either side of the vertical center of the windshield of the craft.

A transparent ventilator 21 in accordance with the invention is centrally located within the windshield 12. A ventilator box 22 resides within a central windshield opening which is bordered by gaskets 23 (see FIG. 4). The gaskets receive and seal into the windshield the various components of the ventilator box.

The box components are a transparent top plate 25, parallel side plates 26, 27 and a front panel 28.

Front panel 28 curves toward the windshield in a bottom cup 29. Cup 29 terminates in an edge 31 which, together with side plates 26, 27 defines an air opening 32.

Thus the ventilator-receiving opening in windshield 12 is completely closed by the components of the ventilator box with the exception of bottom opening 32.

A horizontally extending hinge rod 35 pivotally supports a ventilator baffle 36. The baffle is of a transparent material and extends upwardly from the hinge rod to a semi-cylindrical top trough 38. Top trough 38 terminates forwardly in an edge 39 which, when the baffle is in the position of FIG. 3, seals against the inner side of front panel 28.

Figure 3:
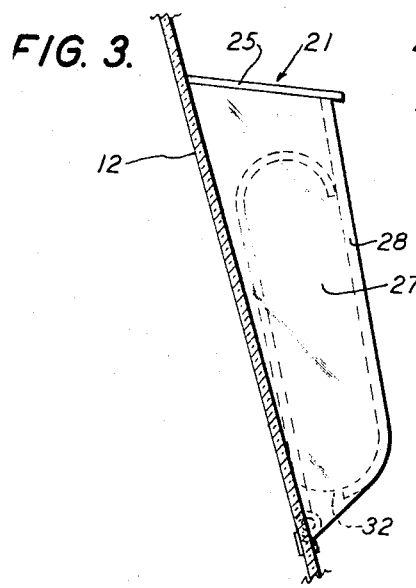
FIG. 3 is a sectional elevation taken along line 3—3 of FIG. 1.
Figure 4:
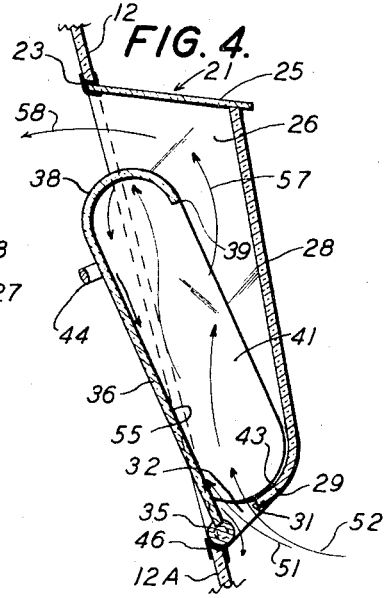
FIG. 4 is a sectional elevation taken along line 4—4 of FIG. 1.

The ventilator baffle has side flanges like the flange 41 seen in FIG. 4. Both side flanges are shaped at their bottom portions 43 in a curved configuration which matches the inner curvature of bottom cup 29 of front panel 28. A handle 44 affixed to the inside surface of baffle 36 provides for moving the baffle between the positions of FIG. 3. and of FIG. 4.

Preferably hinge rod 35 seats against a horizontal gasket 46 which caps the upper edge of a lower windshield portion 12A. With the gasket and ventilator box arrangement, the windshield opening is effectively sealed against entry of any air or moisture except through bottom ventilator opening 32.

The flow pattern of the moisture and air is shown in FIG. 4. As indicated by the arrows 51, 52, incoming air and spray enters through opening 32. The heavier spray particles impinge against the inner surface 55 of baffle 36. Other spray particles are carried upwardly by the velocity of the air to impinge against baffle trough 38. The moisture tends to adhere to the curvature of the baffle trough and return down the baffle for discharge through opening 32, as indicated by the dotted arrows 56. The air swirls upwardly from the underside of baffle trough 38 and enters the upper box and thence into the cockpit, as indicated by arrows 57, 58.

When the baffle is in the closed position of FIG. 3, the air entry patterns are the same except that there is, of course, no flow around the upper portion of baffle 38.

Figure 5:
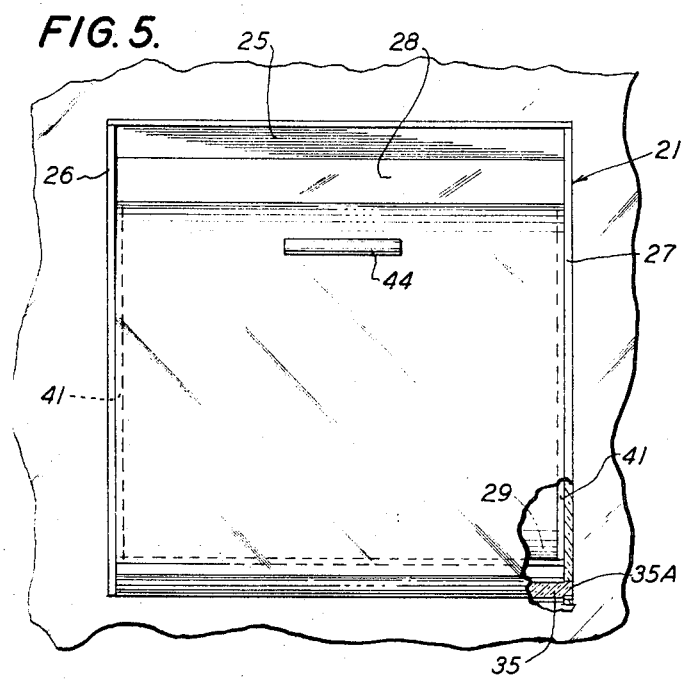
FIG. 5 is a rear elevation of the embodiment of FIGS. 1–3.

FIG. 5 is an elevational view from the interior of the craft. The gaskets 23 and 46 and their vertical concomitants are not shown for clarity. The proportions shown are illustrative only and vary with the size of the craft and the ventilating needs. In a break-away portion of the figure the arrangement for hinge rod 35 is shown. A reduced diameter portion of the rod 35A is journalled in the bottom portion of side panels 26 and 27 of the ventilator box.

Figure 6:
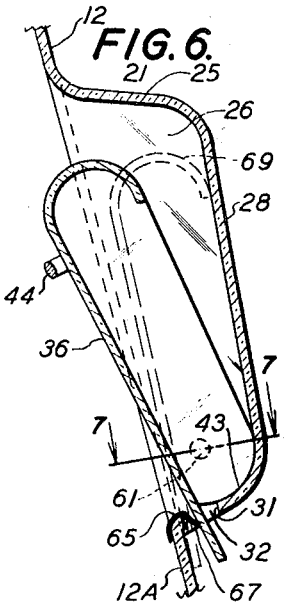
FIG. 6 is a sectional elevation similar to FIG. 4 showing an alternate embodiment of the invention.
Figure 7:
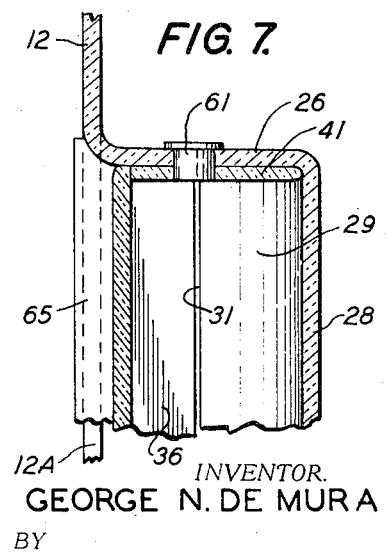
FIG. 7 is a fragmentary sectional view showing the pivot arrangement for the baffle of the embodiment of FIG. 6.

FIGS. 6 and 7 illustrate an alternate embodiment of the invention in which the ventilator box components, such as top panel 25, front plate 28 and side panels 26 and 27 are integrally formed with the windshield 12. The configuration of the front panel is the same with its curved cup portion terminating in a horizontal edge 31 which in part defines bottom opening 32. Baffle 36 is similar to the baffle described with respect to FIGS. 3 and 4 except that hinge pins 61 journal the baffle with respect to the ventilator box. The center of each hinge pin coincides with the radius point of the inner curvature 43 of the bottom cup of front plate 28. The baffle itself extends through opening 32 to overlap below a portion 12A of the windshield. A horizontal windshield gasket 65 having a resilient lip 67 affords a seal between the windshield opening and the projecting portion of the baffle. As can be seen from FIG. 6, the baffle is movable between the closed dotted position 69 and the open full line position shown. Suitable latches may be used to hold the baffle in closed position if desired.

FIG. 7 shows in enlarged detail the arrangement whereby hinge pins 61 pivotally mount the baffle within the ventilator box. The pins extend through side panels 26 and 27 (not shown) and extend into the flanges 41 of the baffle.

While the invention has been illustrated with respect to waterborne craft, the principles of the invention are applicable to the frontal areas of most moving vehicles and stationary habitations subject to frequent heavy winds with airborne particles such as spray or sand and dust. While the side panels of the ventilator box and the flanges of the ventilator baffle have been described as transparent, there are situations in which visibility requirements do not necessitate transparent side panels and flanges. However, from an efficient fabrication standpoint, it would be simpler if both the ventilator and the baffle were of the same material.

Many other variations within the scope of the invention will occur to those skilled in this particular art. Therefore, I wish the foregoing description to be regarded as illustrative only and the measure of the invention to be the appended claims.

I claim:

1. A ventilator for use with a ported transparent wind screen of a habitable enclosure environed in an air stream and comprising exteriorly projecting top, parallel side and transparent front panels sealed to the wind screen about the port thereof to define a ventilator box; a curving bottom on the front transparent panel the terminating edge of which partly defines a ventilator box opening; a transparent ventilator baffle hinged within the confines of the ventilator box, parallel baffle side flanges projecting therefrom to slidably engage the side panels of the evntilator box, a semi-cylindrical upper deflector on the ventilator baffle, a front edge on the deflector adapted to seal against the inner face of the box front panel to preclude air flow upwardly in the box beyond the deflector; and means for pivoting the baffle away from the box front panel to define an air passage in the box between the deflector and the box front and top panels.

2. A ventilator in accordance with claim 1 wherein each ventilator box component is transparent.

3. A ventilator in accordance with claim 2 wherein each baffle component is transparent.

4. A ventilator in acocrdance with claim 1 wherein a bottom protrusion of the baffle projects through the ventilator box opening exteriorly of the wind screen.

5. A ventilator in accordance with claim 1 wherein each side flange of the baffle has a bottom contour matching the contour of the front panel curving bottom.

6. A ventilator in accordance with claim 1 wherein the baffle terminates at its bottom in a cylindrical hinge bar, and further comprising a resilient horizontal gasket sealing the rotating hinge bar and the lower edge of the wind screen port against impinging air flow.

7. A ventilator in accordance with claim 1 wherein the wind screen port and ventilator box are integrally formed with said wind screen.

References Cited

FOREIGN PATENTS 785,606  10/1957  Great Britain.

MEYER PERLIN, *Primary Examiner.*

W. E. WAYNER, *Assistant Examiner.*

U.S. Cl. X.R.

98—2, 96